(12) United States Patent
Paritsky et al.

(10) Patent No.: US 6,603,105 B2
(45) Date of Patent: Aug. 5, 2003

(54) SMART OPTICAL MICROPHONE/SENSOR

(75) Inventors: Alexander Paritsky, Modiin (IL); Sergey Smirnov, Yehud (IL)

(73) Assignee: Phone-Or Ltd., Or-Yehuda (IL)

( * ) Notice: Subject to any disclaimer, the term of this patent is extended or adjusted under 35 U.S.C. 154(b) by 186 days.

(21) Appl. No.: 09/758,635

(22) Filed: Jan. 10, 2001

(65) Prior Publication Data
US 2001/0042844 A1 Nov. 22, 2001

(30) Foreign Application Priority Data
Jan. 10, 2000 (IL) ................................. 133970

(51) Int. Cl.[7] .................................... G01J 1/32
(52) U.S. Cl. ........................... 250/205; 250/231.1
(58) Field of Search ................. 250/227, 231, 250/221, 207, 226, 205–206, 216, 227.23, 227.27, 231.1; 356/373, 4.01, 35.5, 477; 359/212, 182, 151; 280/559.01; 340/626, 630; 381/172

(56) References Cited

U.S. PATENT DOCUMENTS 3,705,308 A * 12/1972 Lehovec ...................... 250/552
4,443,700 A * 4/1984 Macedo et al. ........... 250/227.16
5,006,701 A * 4/1991 Kothe et al. .................. 250/205
5,258,720 A * 11/1993 Tanis et al. ...................... 327/7
5,838,007 A * 11/1998 Wang ......................... 250/338.5

FOREIGN PATENT DOCUMENTS

| EP | 0 926 027 A2 | | 6/1999 | |
| JP | 61029919 | | 2/1986 | |
| JP | 62195519 | | 8/1987 | |
| JP | 62195519 A | * | 8/1987 | ............ G01D/5/26 |
| JP | 09243445 | | 9/1997 | |
| JP | 0926027 | | 6/1999 | |

* cited by examiner

Primary Examiner—David Porta
Assistant Examiner—Patrick J Lee
(74) Attorney, Agent, or Firm—William Michael Hynes; Townsend and Townsend and Crew LLP

(57) ABSTRACT

The invention provides a smart optical microphone/sensor for sensing distances to a membrane or to a light-reflecting surface, including a source of light for illuminating the membrane or light-reflecting surface; a photodetector for receiving light reflected from the membrane or light-reflecting surface and for producing output signals; adjustable means for supplying power to the source of light, and a pre-amplifier for amplifying the output signals, whereby the sensitivity of the microphone/sensor can be adjusted.

12 Claims, 4 Drawing Sheets

SMART OPTICAL MICROPHONE/SENSOR

FIELD OF THE INVENTION

The present invention relates to optical microphone/sensors, and more particularly, to smart optical microphone/sensors.

BACKGROUND OF THE INVENTION

The term "smart optical microphone/sensor," as used herein, is intended to encompass the sensing and/or measurement performance of the device, including the change of its sensitivity and pre-processing of measurement results during the measurement process, making the measurements more exact, more qualitative and more informative, with less errors and noise.

Optical microphone/sensors are constructed of two dynamic and very fast elements: a source of light and a photo-detector. All of the characteristics of optical microphone sensors, such as sensitivity, noise, frequency band, dynamic range, and so on, depend upon the working conditions of these two elements, which may be changed very quickly during operation, in "real time."

U.S. Pat. No. 5,771,091 and U.S. Pat. No. 6,091,497 disclose optical microphone/sensors including a source of light, producing light used in sensing measurements, which light is sent to a reflective membrane directly from the source or through an optical guide, e.g., an optical fiber or a solid body. Light reflected from the membrane is propagated to a photo-detector directly, or through another light guide. Output signals from the photo-detector are proportional to the intensity of the reflected light.

Smart optical microphone/sensors may change their sensitivity, noise level, amplitude and frequency characteristics, background noise suppression, etc. Such microphone/sensors produce measurements in analog and/or digital form. All of these changes may be made automatically, according to environmental conditions, or according to instructions from an internal and/or external processor. Smart optical microphone/sensors may change their internal characteristics during the measurement process without human intervention; however, known ordinary microphones and sensors do not possess the ability to change their characteristics after production; even more so, during their operation.

DISCLOSURE OF THE INVENTION

It is therefore a broad object of the present invention to provide a smart optical microphone/sensor that may change internal characteristics and measurement according to conditions, results and other needs.

It is a further broad object of the present invention to provide a smart optical microphone/sensor that is able to perform measurements in pulse form in an economical manner, and that may produce output measurements in analog and/or digital form.

According to the present invention, there is therefore provided a smart optical microphone/sensor for sensing distances to a membrane or to a light-reflecting surface, comprising a source of light for illuminating the membrane or light-reflecting surface; a photodetector for receiving light reflected from the membrane or light-reflecting surface and for producing output signals; adjustable means for supplying power to the source of light and a pre-amplifier for amplifying the output signals, whereby the sensitivity of the microphone/sensor can be adjusted.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is an electrical-optical scheme of a smart optical microphone/sensor according to the present invention;

FIG. 2 is an electrical-optical scheme of the microphone/sensor of FIG. 1, including a potentiometer for adjusting power to the light source;

FIG. 3 is an electrical-optical scheme of the microphone/sensor of FIG. 2, including an amplifier;

FIG. 4 is an electrical-optical scheme of the microphone/sensor of FIG. 3, including a control unit;

FIG. 5 is an electrical-optical scheme of the microphone/sensor of FIG. 3, including a logarithmic circuit;

FIG. 6 is an electrical-optical scheme of the microphone/sensor of FIG. 5, including a control circuit;

FIG. 7 is an electrical-optical scheme of the microphone/sensor operable by a pulsating source;

FIG. 8 is an electrical-optical scheme of the microphone/sensor of FIG. 7, showing a further embodiment of the present invention;

FIG. 9 is an electrical-optical scheme of the microphone/sensor of FIG. 7, showing a still further embodiment of the present invention, and FIG. 10 is an electrical-optical scheme of the microphone/sensor according to a yet further embodiment of the present invention.

DETAILED DESCRIPTION OF PREFERRED EMBODIMENTS

Figure 1:
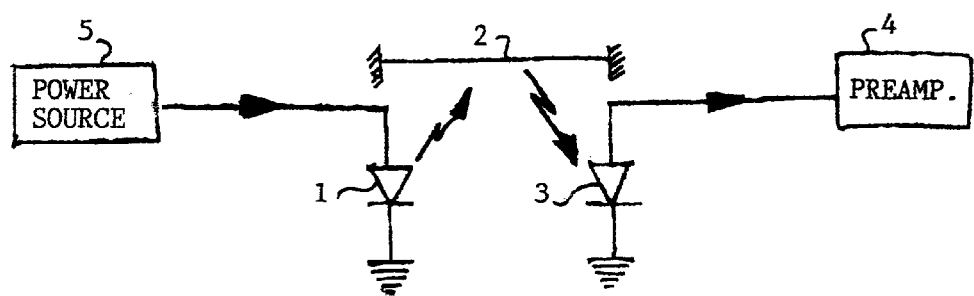

There is shown in FIG. 1 a smart optical microphone/sensor according to the present invention, comprising a light-emitting diode 1 (LED) that illuminates a microphone membrane 2. The reflected light is transmitted, directly or through a light guide, to a photodetector (PD) 3, the electrical output of which is connected to a preamplifier 4. The electrical input of LED 1 is connected to power source 5, supplying LED 1 with a determined current.

The intensity of the light produced by LED 1 is a direct function of power source 5: the higher the current, the higher is the light intensity produced; and the higher is the light intensity that is reflected by the membrane 2 to PD 3. Consequently, the output signal of PD 3 that is fed to the preamplifier 4 is higher. The sensitivity of the optical microphone/sensor is thus proportional to the light intensity produced by the LED 1, expressed as $J_{LED}$. In other words, it is proportional to the electrical current fed to LED 1, expressed as $I_{LED}$. Hence, $$U_{out} = k_1 J_{LED} = k_2 I_{LED}$$

wherein:

$k_1$ and $k_2$ are constants.

The signal-to-noise ratio (SNR) of optical microphone/sensors is a function of light intensity produced by the LED and/or current feeding the LED:

$$SNR=k_3(J_{LED})^{1/2}=k_4(I_{LED})^{1/2}$$

wherein:

$k_3$ and $k_4$ are constants.

It is obvious from the above formulae that the sensitivity of an optical microphone/sensor and its SNR is dependent upon the determined current supplied by power source 5.

Figure 2:
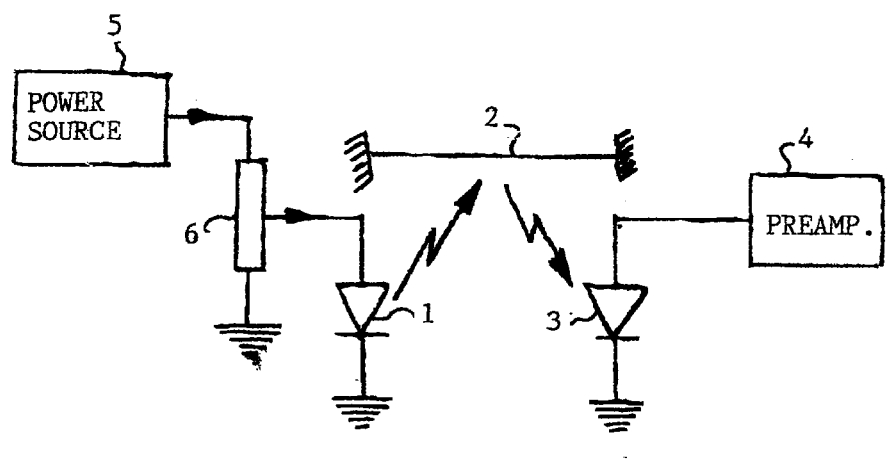

According to the embodiment of FIG. 2, the power source 5 supplies voltage through potentiometer 6. Power source 5 is a regular source of direct voltage. Potentiometer 6 enables the fine tuning of current that is fed to LED 1 and thus of the sensitivity of the optical microphone/sensor.

Figure 3:
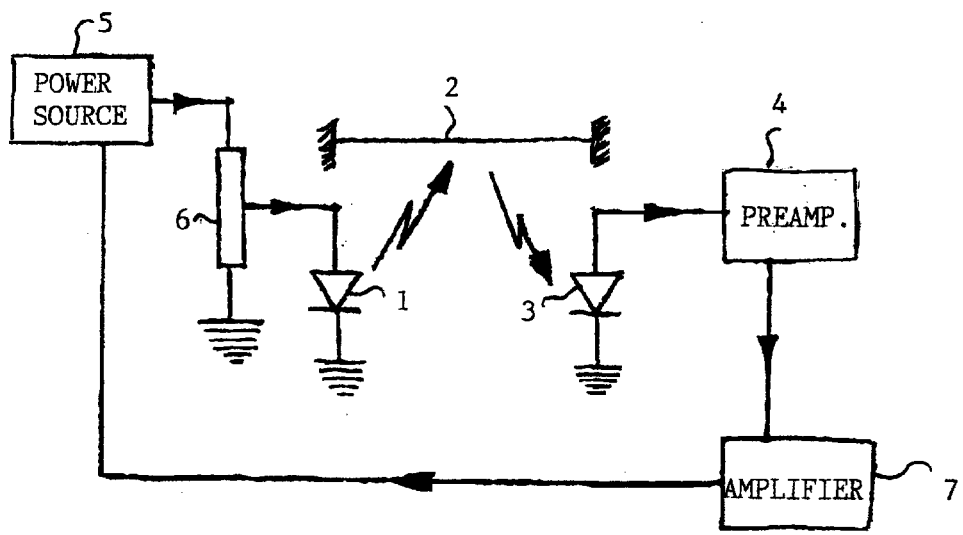

In FIG. 3 there is illustrated a further embodiment in which the input of an electronic amplifier 7, having a determined frequency band, is connected to the output of the PD's preamplifier 4, and the instantaneous values of the output signals of amplifier 7 are in an opposite phase with the instantaneous values of the preamplifier output signals. The output of electronic amplifier 7 is connected to power source 5. The instantaneous value of output voltage of the electronic amplifier 7 is added to the direct voltage of source 5, in an opposite phase to the instantaneous values of the PD's preamplifier 4. This construction enables the production of a regular, instantaneous, negative feedback regulation of the sensitivity of the optical microphone/sensor according to instantaneous measurement results, resulting in a very stable, dynamic and flexible measurement device.

The electronic amplifier 7 of FIG. 3 can be a logarithmic amplifier having high amplification for low instantaneous values of output signals of the PD's preamplifier 4, and low amplification for high instantaneous values of output signals of the PD's preamplifier 4. At the same time, in the embodiment of FIG. 3, instantaneous values of amplifier 7 output signals are in opposite phase to the instantaneous values of preamplifier 4 output signals. Low instantaneous signals of the PD's preamplifier 4 are amplified by the logarithmic amplifier 7 and produce an instantaneous negative feedback for regulating the sensitivity of the optical microphone/sensor. At the same time, high instantaneous signals of the PD's preamplifier 4 are not amplified by the logarithmic amplifier 7 and do not produce any negative regulation feedback of the sensitivity of the optical microphone/sensor. Such sensitivity regulation leads to the suppression of very low input signals, such as electronic noises of the PD 3, non-desirable acoustic and interference noise, etc. At the same time, common or standard measuring signals are measured with regular microphone sensitivity and the common optical microphone/sensor signal-to-noise ratio (SNR) is much higher according to this embodiment than in the previous ones.

In accordance with a further modification of the embodiment of FIG. 3, the output of preamplifier 4 is connected to the input of the electronic amplifier 7 having a predetermined frequency band, and the instantaneous values of the output signals of the electronic amplifier 7 are in phase with the instantaneous values of the output signals of preamplifier 4. The output signals of amplifier 7 are fed to the power source 5 and added to the predetermined voltage fed through potentiometer 6 and microphone LED 1. In this case, the entire measuring system possesses instantaneous positive feedback characteristics and emphasizes the high instantaneous measuring signals in comparison with low instantaneous measuring signals.

Figure 4:
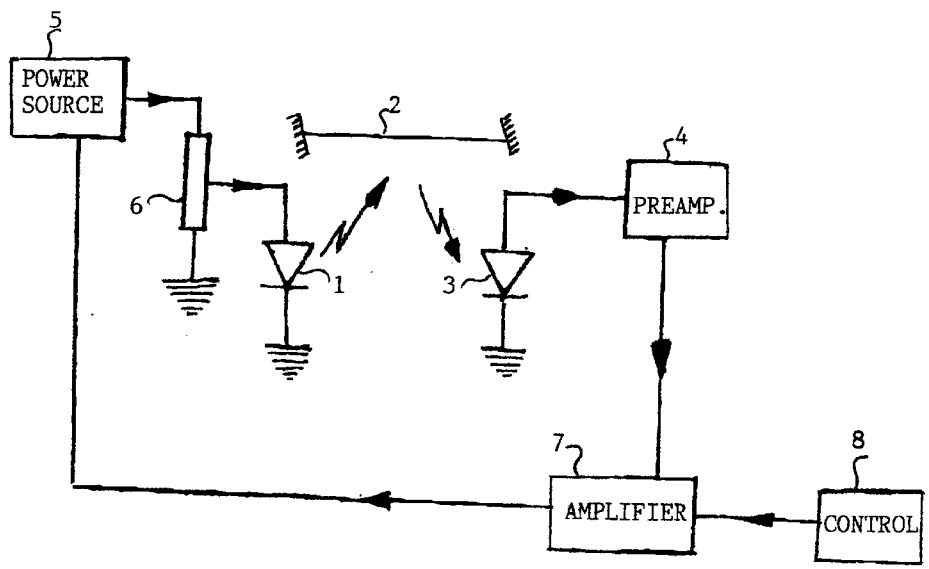

As seen in FIG. 4, a control unit 8 is connected to the amplifier 7 in order to change the amplification value and frequency band of the amplifier 7. In this case, the level of instantaneous signals that influences the microphone's negative feedback may be changed by the control signal of the control unit 8, in accordance with measured conditions such as higher or lower noise, etc. At the same time, control unit 8 may change not only the level of signals for negative feedback, but also the frequency range of such a signal level. It may decrease the signal level for low frequency signals and increase it for high frequency signals, or vice-versa. This enables the influence of the noise to be diminished in any region of the microphone's working frequency band, even if the noise is not over the entire band.

Figure 5:
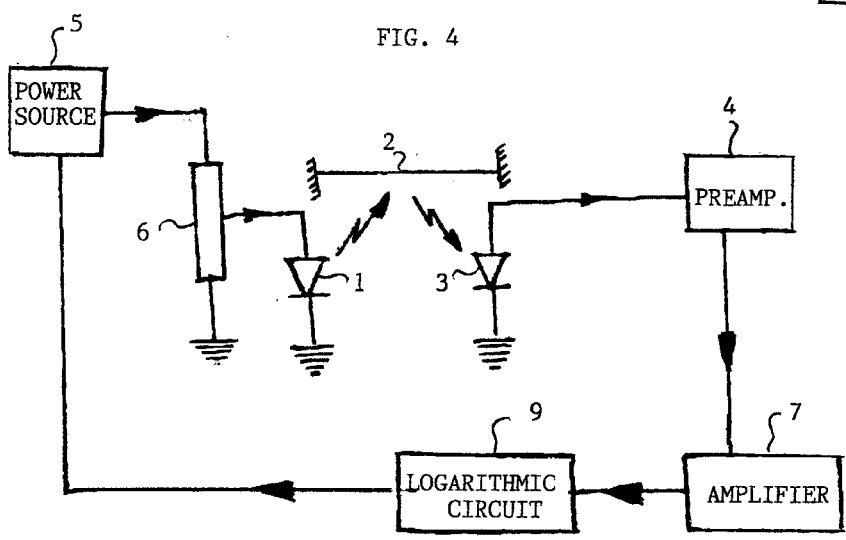

In the embodiment of FIG. 5, the connection between the output of amplifier 7 and the predetermined voltage of the power source 5 is made through a logarithmic circuit 9 having high resistance for low instantaneous values of the output signals of amplifier 7 and low resistance for high instantaneous values of the output signals of amplifier 7. In this case, the effect of instantaneous positive feedback will produce only high instantaneous values of amplifier 7 output signals. At the same time, low instantaneous value of amplifier 7 output signals will not produce any positive feedback effect. This is another way of emphasizing measured signals of regular amplitude in comparison with low noisy signals, and increases the SNR of the optical microphone/sensor.

Figure 6:
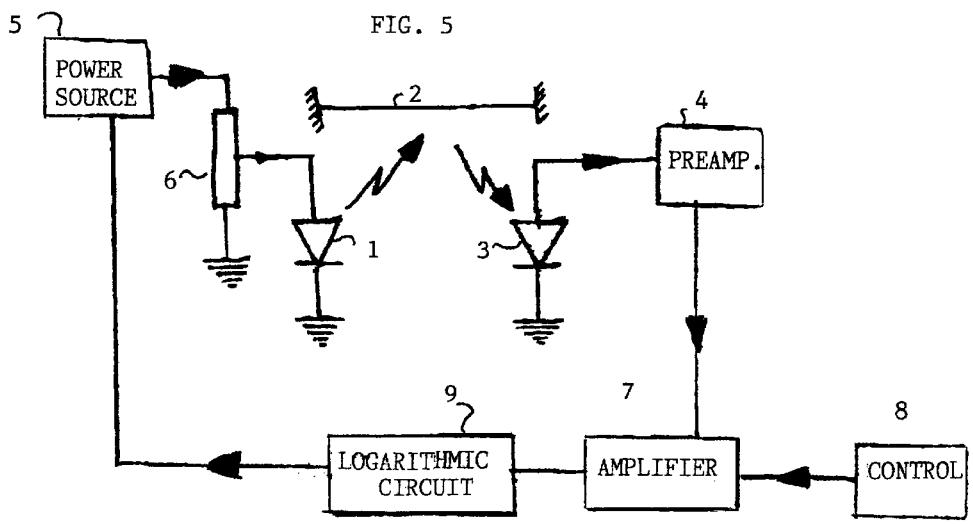

FIG. 6 illustrates a modification of the optical microphone/sensor of FIG. 5, in which the amplification value of amplifier 7 in different frequency ranges may be changed by control signals from the control unit 8 connected to amplifier 7. In this case, a value of instantaneous positive feedback level and the frequency range of this specific level may be changed during the measurement process, and the SNR of the optical microphone/sensor may be corrected before and/or during measurement, depending on the measurement conditions or needs.

Figure 7:
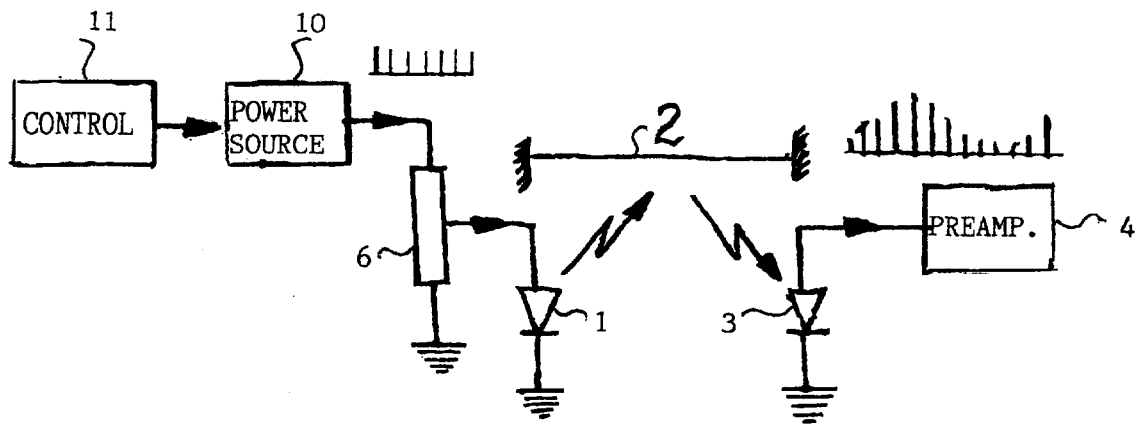

The embodiment of FIG. 7 provides a power source 10 which is a source of voltage pulses. The pulse width, pulse period, and pulse duration may be varied manually or automatically, in accordance with an operating signal from a control unit 11 and/or in accordance with the algorithm of the control unit 11, with a view towards changing the sensitivity and/or power consumption of, and/or synchronizing the working condition of, the optical microphone/sensor.

In this embodiment, the power source 10 produces pulses of predetermined constant amplitude. These pulses are fed to LED 1 via potentiometer 6 to produce pules of light. The pulses are reflected by membrane 2 and received by PD 3. Electrical pulses from PD 3 are fed to the preamplifier 4. In this case, LED 1 of the optical microphone/sensor consumes energy only during the transmission of the pulses. If the pulse duration is very small, the microphone's energy consumption is small. It is thus possible to economically operate such a microphone. Control unit 11 provides the ability to change pulse width, pulse period, and pulse duration.

Figure 8:
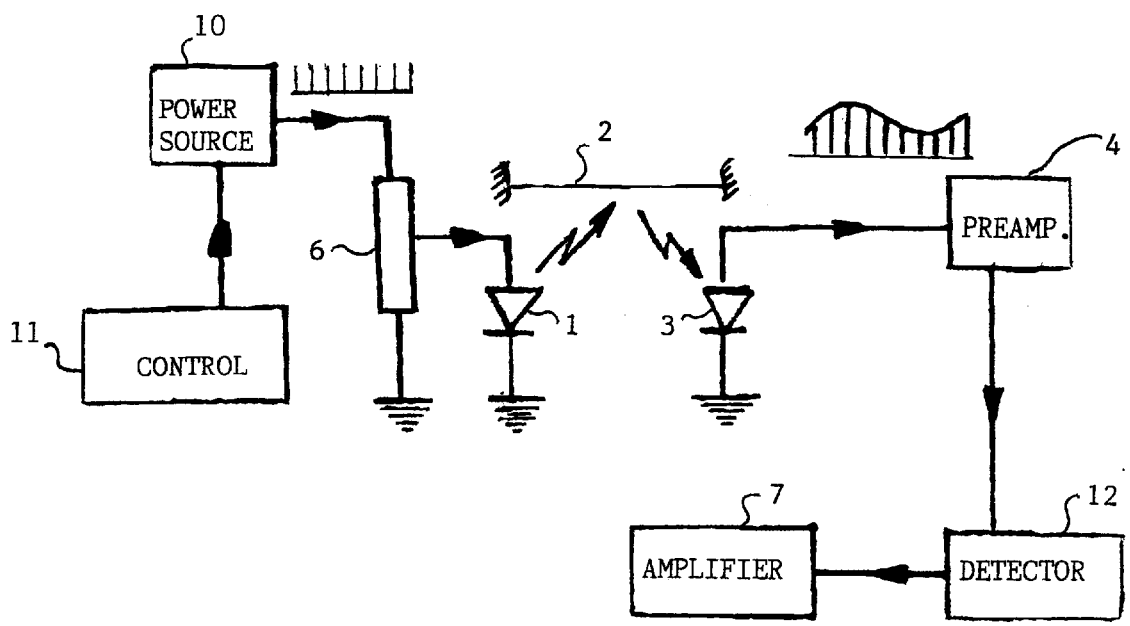

The output of the photo-detector preamplifier 4 of FIG. 8 is connected to the input of a pulse sample and hold detector 12, which measures the amplitude of the pulses received from photo-detector preamplifier 4. Detector 12 holds the amplitude of every pulse up to the next pulse. The output of the sample and hold detector 12 is connected to the input of the electronic amplifier 7. In this embodiment, the electronic amplifier 7 may be used in all of the above-described manners, such as negative feedback, positive feedback, logarithmic amplification, etc.

Figure 9:
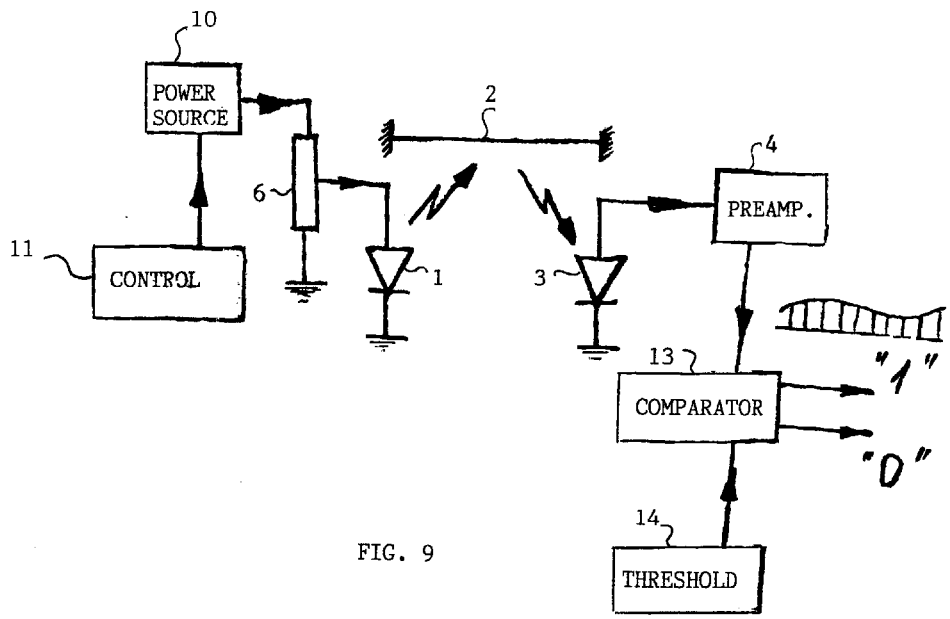

FIG. 9 illustrates a circuit in which the output of the photo-detector preamplifier 4 is connected to an electronic comparator 13 which compares the amplitude of every incoming pulse at the output photo-detector preamplifier 4 with a predetermined threshold voltage that is set by a unit 14, and if the pulse is lower or equal to the predetermined voltage, it produces an output signal equivalent to "1." If the incoming pulse is higher than the predetermined voltage set by the unit 14, comparator 13 produces an output signal equivalent to "0." In that manner, the output signals of comparator 13 are "1" or "0" for every measuring pulse of the optical microphone/sensor. These output signals may be utilized by devices connected to the microphone, such as a cellular telephone, a computer, etc., for executing conversion of the measured signals.

Figure 10:
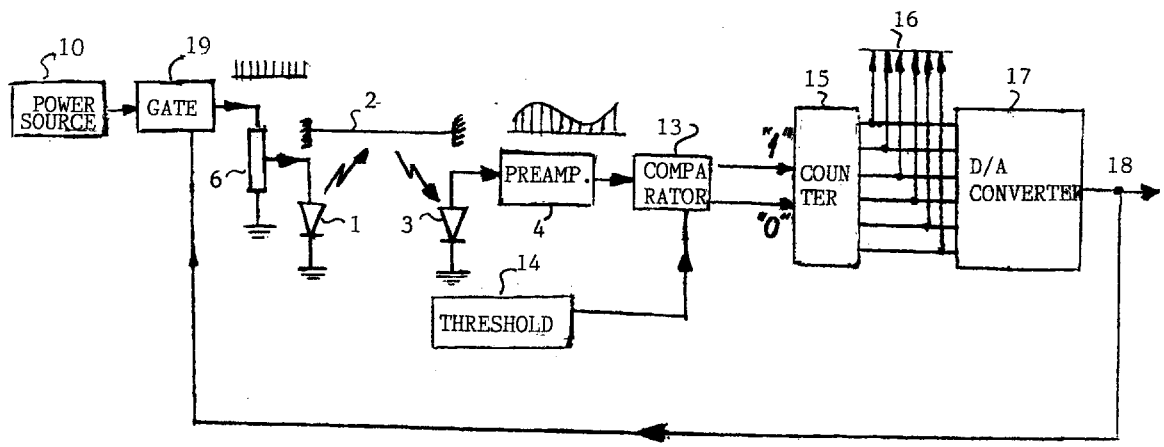

As seen in FIG. 10, the output of the comparator 13 is connected to a counter 15. The counter 14 adds a digital value to its internal digital value if the output signal is "1," and subtracts a digital value from its internal digital value if the output signal is "0." All digital outputs 16 of the counter internal digital value, are connected in parallel to a digital-to-analog converter 17, and the output 18 of this converter is connected to one input of an electronic gate 19. Another input of the electronic gate 19 is connected to the source of power 10, producing the pulses. The output of the electronic gate 19 is connected to the potentiometer 6, 50 that the pulses coming to LED 1 are amplitude modulated. The amplitude of pulses in the input of the comparator 13 is always close to the value of the predetermined voltage from the unit 14. In this realization, the optical microphone/sensor is a digital microphone/sensor providing measurement results in digital form at gate 19 and in analog form at output 18. Such a microphone simplifies the construction of the devices that will use the results of microphone measurement in digital and analog form in parallel, such as cellular telephones, computers, and the like.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A smart optical microphone/sensor comprising:
   a membrane mounted for flexible movement for receiving and undergoing motion responsive to sound, the membrane having a light-reflecting surface;
   means for sensing motion of the membrane responsive to sound including,
      a source of light fixed with respect to the membrane for illuminating the light-reflecting surface of the membrane, the source of light having a power input and outputting light proportional to power at the power input;
      adjustable means for supplying adjustable power to the power input of the source of light;
      a photodetector having a light input fixed with respect to the membrane and an output responsive to the light received at the photodetector input, the photodetector for receiving light from the light source reflected from the light reflective surface of the membrane at the input, the photodetector producing output signals which are a combination of the power to the power input of the source of light and the movement of the light reflective surface of the membrane; and,
   a pre-amplifier connected to the photodetector output for amplifying the output signals,
   whereby the sensitivity of said microphone/sensor can be adjusted by the adjustable means for supplying power to the light source.

2. The microphone/sensor as claimed in claim 1, wherein:
   the adjustable means comprises means for changing the current flow to said source of light.

3. The microphone/sensor as claimed in claim 1, wherein:
   an amplifier connected to the output of said preamplifier, said amplifier being connected to said adjustable means to input to the adjustable means the instantaneous output signal values of said preamplifier.

4. The microphone/sensor as claimed in claim 3, further comprising:
   the amplifier being connected to said adjustable means such that the output signals of said amplifier are in opposite phase to the instantaneous output signal values of said preamplifier.

5. The microphone/sensor as claimed in claim 3, further comprising:
   the amplifier being connected to said adjustable means such that the output signals of said amplifier are in phase with the instantaneous output signal values of said preamplifier.

6. The microphone/sensor as claimed in claim 3, wherein:
   the amplifier has high amplification power for low values of output signals of said preamplifier and low amplification power for high values of output signals of said preamplifier.

7. The microphone/sensor as claimed in claim 3 wherein:
   the amplifier is connected to said adjustable means via a control unit operable to vary the amplification value and frequency band of said amplifier.

8. The microphone/sensor as claimed in claim 3, wherein:
   the amplifier is a logarithmic amplifier having high resistance to low values of output signals of said preamplifier and low resistance to high instantaneous values of output signals of said preamplifier.

9. The microphone/sensor as claimed in claim 1, wherein:
   the adjustable means for supplying power to said source of light is a source of pulses, whereby power consumption of said microphone/sensor can be adjusted.

10. The microphone/sensor as claimed in claim 9, further comprising:
    a pulse sample and hold detector for measuring the amplitude of said pulses and holding the pulse amplitude up to the next pulse, wherein the output of the pulse sample and hold detector is connected to the input of an amplifier.

11. The microphone/sensor as claimed in claim 9, wherein:
    the preamplifier is connected to a comparator for comparing the voltage amplitude of each of the pulses at the output of said preamplifier to a preset voltage, and for producing an output signal of logical "1" when the voltage of a pulse is equal to, or lower than, said preset voltage, and an output signal of logical "0" when the voltage of a pulse is higher than said preset voltage.

12. The microphone/sensor as claimed in claim 11, further comprising:
- a counter connected to said comparator, said counter being operative to add a unit to its internal digital value upon receiving a logical "1" signal from said comparator, and to subtract a unit from its internal digital value upon receiving a logical "0" signal;
- a digital-to-analog converter connected to said counter, and
- a gate connected to the output of said converter, the gate being connected between the source of pulses and said adjustable means;
- whereby the pulses initiating the source of light are amplitude-modulated in such a way that the amplitude of the pulses at the input of said comparator is close to the value of said preset voltage.

* * * * *